US010518225B2

(12) United States Patent
Onyemauwa et al.

(10) Patent No.: US 10,518,225 B2
(45) Date of Patent: Dec. 31, 2019

(54) FLUOROPOLYMERS AND MEMBRANES COMPRISING FLUOROPOLYMERS (II)

(71) Applicant: Pall Corporation, Port Washington, NY (US)

(72) Inventors: Frank Okezie Onyemauwa, Pace, FL (US); Hassan Ait-Haddou, Melville, NY (US)

(73) Assignee: Pall Corporation, Port Washington, NY (US)

( * ) Notice: Subject to any disclaimer, the term of this patent is extended or adjusted under 35 U.S.C. 154(b) by 216 days.

(21) Appl. No.: 15/237,192

(22) Filed: Aug. 15, 2016

(65) Prior Publication Data

US 2018/0043314 A1 Feb. 15, 2018

(51) Int. Cl.
*B01D 71/32* (2006.01)
*B01D 67/00* (2006.01)
*C08F 226/06* (2006.01)
*B01D 71/80* (2006.01)

(52) U.S. Cl.
CPC ......... *B01D 71/32* (2013.01); *B01D 67/0013* (2013.01); *B01D 71/80* (2013.01); *C08F 226/06* (2013.01); *B01D 2323/02* (2013.01); *B01D 2325/36* (2013.01)

(58) Field of Classification Search
CPC ............ B01D 2323/02; B01D 2325/30; B01D 2325/36; B01D 2325/38; B01D 67/0013; B01D 69/02; B01D 71/28; B01D 71/32; B01D 71/80; C08F 14/185; C08F 226/06
See application file for complete search history.

(56) References Cited

U.S. PATENT DOCUMENTS

| 4,954,256 A | 9/1990 | Degen et al. |
| 5,232,600 A | 8/1993 | Degen et al. |
| 2004/0242822 A1* | 12/2004 | Gawrisch ............... C08F 222/20 526/266 |

(Continued)

FOREIGN PATENT DOCUMENTS

| CN | 1255876 A | 6/2000 |
| CN | 104837542 A | 8/2015 |

(Continued)

OTHER PUBLICATIONS

Bouteiller, Veronique et al., "Synthesis, thermal and surface characterization of fluorinated polystyrenes", Polymer International, 48, 1999, pp. 765-772 (Year: 1999).*

(Continued)

*Primary Examiner* — Latosha Hines
(74) *Attorney, Agent, or Firm* — Leydig, Voit & Mayer, Ltd.

(57) ABSTRACT

Disclosed are a copolymer, porous membranes made from the copolymer, and a method of treating fluids to remove metal ions using the porous membranes, for example, from fluids originating in the microelectronics industry, wherein the copolymer includes monomeric units I and II, wherein monomeric unit I is of the formula A-X—$CH_2$—B, wherein A is Rf—$(CH_2)$n, Rf is a perfluoro alkyl group of the formula $CF_3$—$(CF_2)_x$—, wherein x is 3-12, n is 1-6, X is O or S, and B is vinylphenyl, and monomeric unit II is vinylpyridine.

14 Claims, 2 Drawing Sheets

(56) References Cited

U.S. PATENT DOCUMENTS

| | | | |
|---|---|---|---|
| 2009/0277837 A1 | 11/2009 | Liu et al. | |
| 2013/0211026 A1* | 8/2013 | Merlo | B01D 71/32 526/243 |
| 2015/0329386 A1* | 11/2015 | Lin | B01D 67/0088 204/632 |
| 2016/0288063 A1* | 10/2016 | Ait-Haddou | C08J 7/047 |

FOREIGN PATENT DOCUMENTS

| | | |
|---|---|---|
| JP | H07-074290 B2 | 8/1995 |
| JP | H10-251352 A | 9/1998 |
| JP | 2005-525431 A | 8/2005 |
| KR | 2013-0105180 A | 9/2013 |
| SG | 10201502131 | 12/2015 |
| WO | WO 2005/091755 A2 | 10/2005 |
| WO | WO 2009/137245 A2 | 11/2009 |

OTHER PUBLICATIONS

Bouteiller et al., "Synthesis, thermal and surface characterization of fluorinated polystyrenes", *Polymer International*, vol. 48, pp. 765-772 (1999).

Boutevin et al., "Synthese D'Ethers et de Thioethers Allyliques Fluores par Catalyse par Transfert de Phase", *Journal of Fluorine Chemistry*, vol. 35, pp. 399-410 (1987).

Hoepken et al., "Low Surface Energy Polystyrene", *Macromolecules*, vol. 25, pp. 1461-1467 (1992).

Kim et al., "Comb-Like Fluorinated Polystyrenes Having Different Side Chain Interconnecting Groups", *Macromolecules*, vol. 42, pp. 3333-3339 (2009).

Kim et al., "Dispersion polymerization in supercritical carbon dioxide using comb-like fluorinated polymer surfactants having different backbone structures", *Journal of Supercritical Fluids*, vol. 55, pp. 381-385 (2010).

Shin et al., "Phase behavior of a ternary system of poly[p-perfluorooctyl-ethylene(oxy, thio, sulfonyl)methyl styrene] and poly[p-decyl(oxy, thio, sulfonyl)methyl styrene] in supercritical solvents", *Journal of Supercritical Fluids*, vol. 47, pp. 1-7 (2008).

Steele et al., "Linear abrasion of a titanium superhydrophobic surface prepared by ultrafast laser microtexturing", *Journal of Micromechanics and Microengineering*, vol. 23, No. 11 (Abstract only).

Korean Intellectual Property Office, Notice of Non-Final Rejection issued in Korean Application No. 10-2017-0103059 (dated Feb. 2, 2018).

Intellectual Property Office of Singapore, Search Report issued in Singapore Application No. 10201706492V (dated Jan. 29, 2018).

Valade et al., "Random and Block Styrenic Copolymers Bearing both Ammonium and Fluorinated Side-Groups", *Journal of Polymer Science*, 49(21): 4668-4679 (2011).

U.S. Appl. No. 15/237,172, filed Aug. 15, 2016.

Cui et al., "Recent Progress in Fluoropolymers for membranes", *Progress in Polymer Science*, 39(1): 164-198 (2014).

Hirao et al., "Synthesis of Well-Defined Chain-End-Functionalized Polystyrenes with Four, Eight, and Sixteen Perfluorooctyl Groups and Their Surface Characterization", *Polymers for Advanced Technologies*, 15(1/02): 15-25 (2004).

Kendall et al., "Polymerizations in supercritical carbon dioxide", *Chemical Reviews, American Chemical Society, US*, 99: 543-563 (1999).

Nelson et al., "Controlled Architecture Material (CAM) Specialty Additives: Interfacial Modifiers in Blends, Foams and Composites", 2004 *Tappi Place Division Conference*: Aug. 29-Sep., 2, Tappi, Norcross, GA, 751-757 (2004).

European Patent Office, Extended European Search Report issued in European Application No. 17184750.2 (dated Jan. 5, 2018).

Korean Intellectual Property Office, Notice of Final Rejection issued in Korean Application No. 10-2017-0103188 (dated Aug. 29, 2018) 6 pp.

Japan Patent Office, Notice of Reasons for Rejection issued in Japanese Application No. 2017-153616 (dated Sep. 4, 2018) 4 pp.

Taiwan Intellectual Property Office, Office Action issued in Taiwanese Application No. 106126555 (dated May 29, 2018) 6 pp.

Canadian Intellectual Property Office, Office Action issued in Canadian Application No. 2,976,508 (dated Jul. 19, 2018) 4 pp.

Intellectual Property Office of Singapore, Written Opinion issued in Singapore Application No. 10201706492V (dated May 29, 2019) 7 pp.

China National Intellectual Property Administration, Office Action issued in Chinese Application No. 201710694151.5 (dated Jun. 4, 2019) 17 pp.

Shi Ying, et al., "Quantitative Chemical Separation Method," *China University of Mining and Technology Press*, 196 (2001).

European Patent Office, Office Action issued in European Application No. 17184750.2 (dated Jun. 26, 2019) 7 pp.

\* cited by examiner

FLUOROPOLYMERS AND MEMBRANES COMPRISING FLUOROPOLYMERS (II)

BACKGROUND OF THE INVENTION

Membranes comprising fluoropolymers are being considered for filtering a variety of fluids, for example, for removing trace metal impurities from microelectronics fluids. Some of these membranes are characterized by low surface energy values or critical wetting surface tension (CWST) values and/or high resistance to organic solvents and aggressive chemicals. Despite the one or more of the advantages of these membranes, there exists a need for fluoropolymers and membranes comprising such fluoropolymers with improved properties such as low CWST values and/or increased resistance to organic solvents and/or aggressive chemicals.

BRIEF SUMMARY OF THE INVENTION

The invention provides fluoropolymers with low CWST values and membranes made from the fluoropolymers. In an embodiment, the invention provides copolymer comprising polymerized monomeric units I and II, wherein monomeric unit I is of the formula A-X—CH$_2$—B, wherein A is Rf—(CH$_2$)n, Rf is a perfluoro alkyl group of the formula CF$_3$—(CF$_2$)$_x$—, wherein x is 3-12, n is 1-6, X is O or S, and B is vinylphenyl, and monomeric unit II is vinylpyridine.

The copolymer is a superhydrophobic polymer and can be used to impart oleophobic properties material surfaces, i.e., a surface tension of below 25 dynes/cm. The invention also provides a method of preparing a porous membrane comprising the copolymer disposed on a porous support. The invention further provides a method of filtering fluids, particularly microelectronics fluids. For example, the porous membranes are suitable for removing metal impurities present in fluids generated in microelectronics to a concentration below 1 ppb, preferably below 0.005 or below detection limit of most instruments.

DETAILED DESCRIPTION OF THE INVENTION

Figure 1:
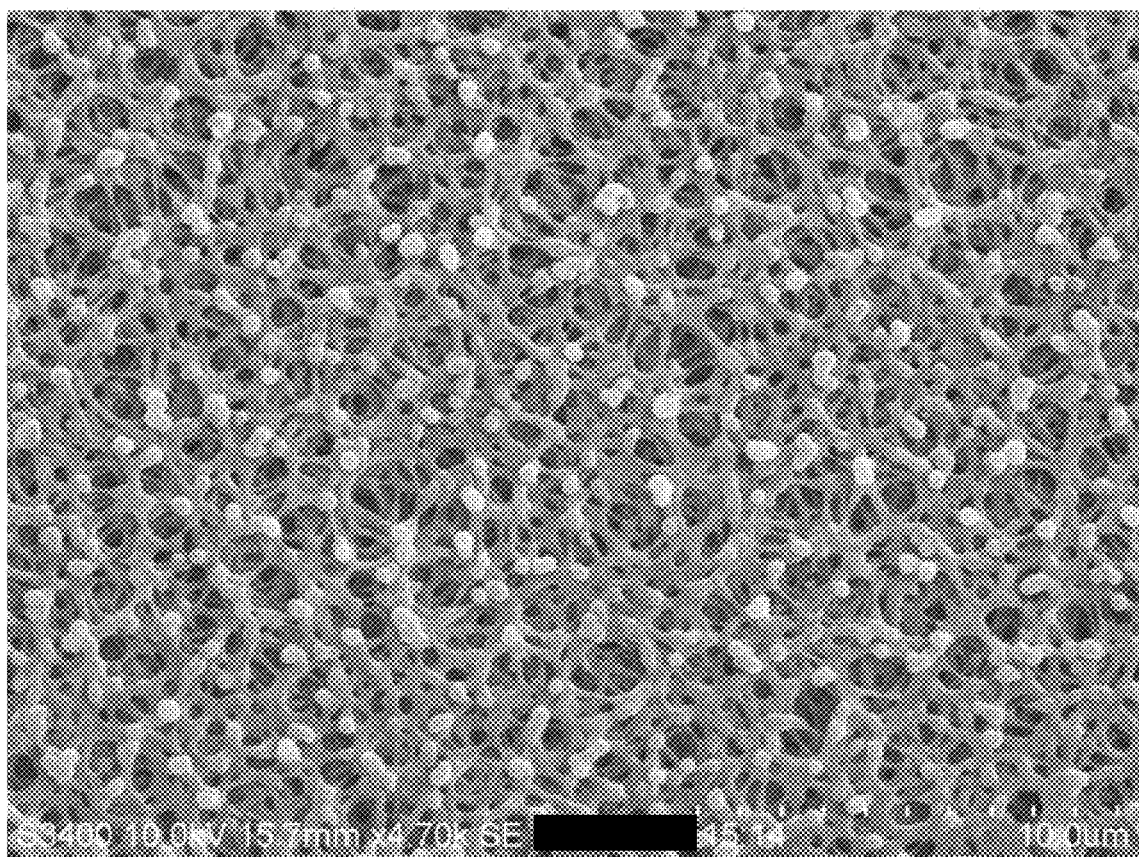
FIG. 1 depicts an SEM micrograph of a PTFE support.

In accordance with an embodiment, the invention provides a copolymer comprising polymerized monomeric units I and II, wherein monomeric unit I is of the formula A-X—CH$_2$—B, wherein A is Rf—(CH$_2$)n, Rf is a perfluoro alkyl group of the formula CF$_3$—(CF$_2$)$_x$—, wherein x is 3-12, n is 1-6, X is O or S, and B is vinylphenyl, and monomeric unit II is vinyl pyridine.

In an embodiment of the copolymer, n=2, 3, or 4, particularly 2.

In any of the above embodiments, x=4, 5, 6, 7, or 8, particularly 6.

In any of the above embodiments, the vinyl pyridine can be 2-, 3-, or 4-vinyl pyridine, particularly 4-vinyl pyridine.

The perfluoroalkyl group can be present on the phenyl ring of B in any suitable position, ortho, meta, or para, preferably meta or para positions, or a mixture of o, m, and/or para isomers can be used. Herein, "p/m" designates a mixture of para and meta isomers.

In any of the above embodiments, the copolymer is a block copolymer, for example, a diblock, a triblock, or a multiblock copolymer, or a random copolymer.

In an embodiment, monomeric unit I comprises a monomer selected from the group consisting of 2-(Perfluorohexyl)ethyl alcohol, 2-(perfluorooctyl)ethyl thiol, 2-(perfluorooctyl)ethyl alcohol, 2-(perfluorohexyl)ethyl thiol, para and/or meta substituted [[(perfluorohexylethylene)oxy]methyl]-styrene, and para and/or meta substituted [[(perfluorohexylethylene)thio]methyl]-styrene.

In an embodiment, the copolymer is selected from the group consisting of a copolymer of poly[p/m-[[(perfluorohexylethylene)thio]methyl]-styrene and polyvinylpyridine and a copolymer poly[p/m-[[(perfluorohexylethylene)oxy]methyl]-styrene and polyvinylpyridine. In another embodiment, the copolymer is selected from the group consisting of a copolymer of poly[p/m-[[(perfluorooctylethylene)thio]methyl]-styrene and polyvinylpyridine; and a copolymer poly[p/m-[[(perfluorooctylethylene)oxy]methyl]-styrene and polyvinylpyridine.

In any of the above embodiments, the copolymer includes at least 35% by volume of the fluorinated chain. In another embodiment, the random copolymer comprises a volume ratio of the perfluoro-styrene group of 50% or less.

The copolymers can be prepared by any suitable technique. For example, a block copolymer can be prepared as illustrated in Scheme 1 or 2.

Scheme 1.

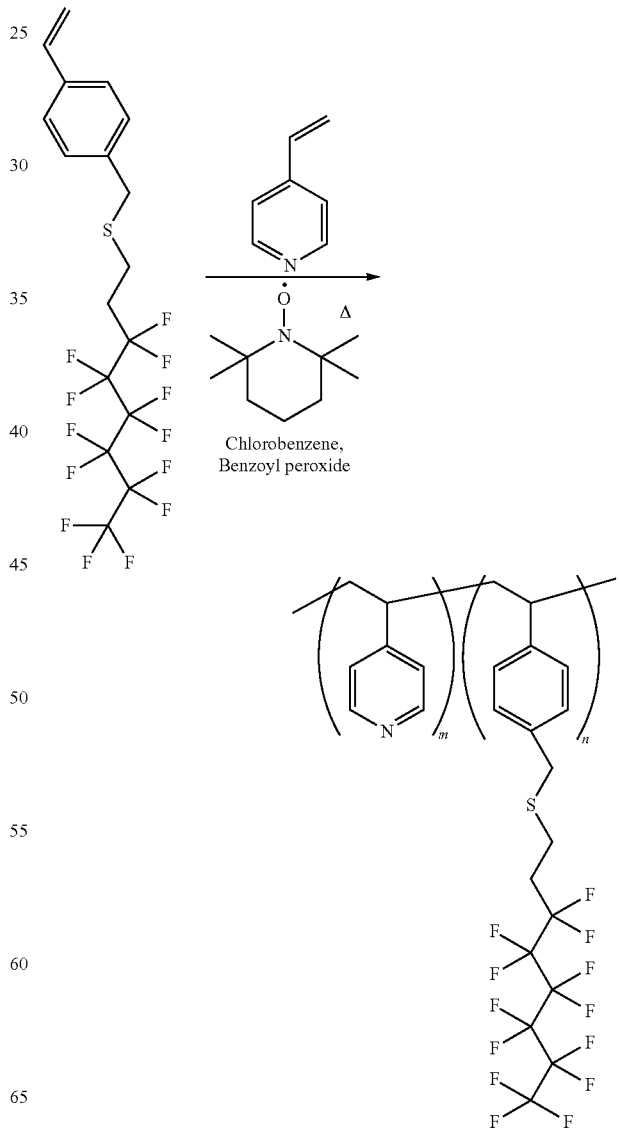

Scheme 2.

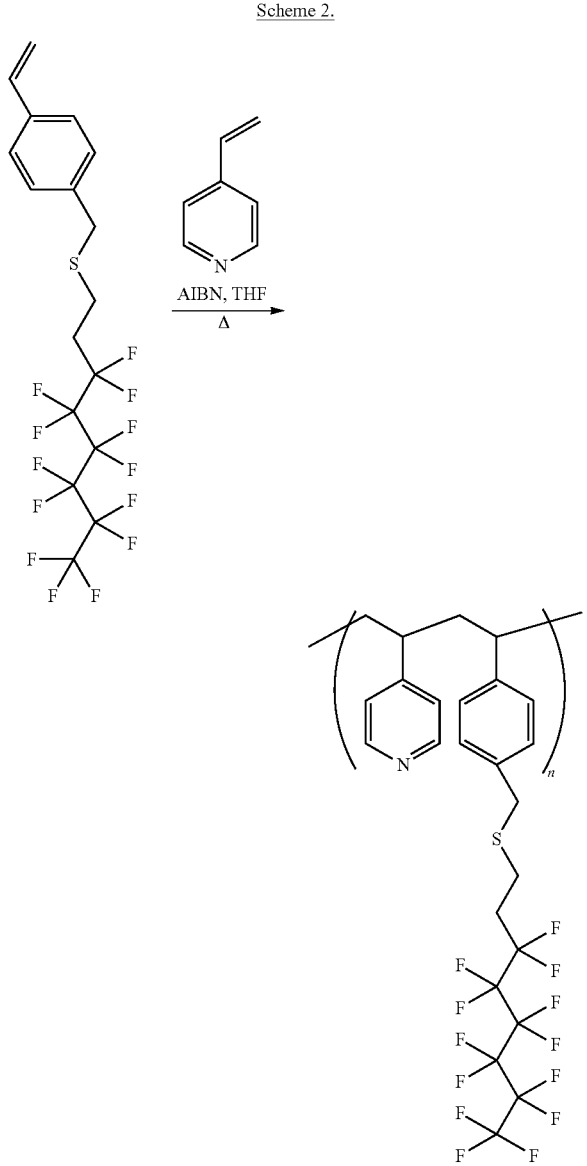

Living free radical polymerization can be used to prepare a block copolymer, and AIBN can be used to prepare a random copolymer. The perfluorohexylethylthiomethyl styrene block advantageously provides the van der Waals forces that interact with the underlying substrate to form a self-assembled structure. This feature can be used for membrane formation, for membrane modification, and for producing hollow fiber membranes. The van der Waals forces provided by the perfluorohexylethylthiomethyl styrene block promotes a phase-separation due to the incompatibility of the two segments (oleophobic and more hydrophilic vinylpyridine block) in selective solvents, thereby enabling defined pore formation and allowing the individual blocks to self-assemble into defined morphologies and ordered domains.

While the block copolymer exhibits oleophobic character with surface tensions as low as, e.g., 20 dynes/cm, indicating hydrocarbon rejection, it also exhibits hydrophilic character with surface tensions as high as 58 dynes/cm with hydrophilic solvents. The random copolymer on the other hand is oleophobic with surface tension as low as, e.g., 20 dynes/cm.

The block copolymer was synthesized by sequential polymerization of 4-vinylpyridine (4VP). Perfluorohexyl ethyl thiomethyl styrene (pfotms) was then added after 40 hours. Briefly, a solution of 4-vinylpyridene (2.63 g, 25 mmol in 2.4 mL chlorobenzene), recrystallized benzyl peroxide (0.061 g, 0.25 mmol) and TEMPO (0.05 g, 0.32 mmol) was charged into a round-bottomed flask. After being degassed in an ice water bath for 20 min, the reaction mixture was heated at the heating bath temperature of 95° C. for 3 h to decompose BPO completely, and at 125° C. for 40 h to allow the polymerization to proceed. The reaction mixture was then cooled to room temperature, and pfotms (6.2 g, 12.5 mmol in 1.6 mL chlorobenzene) was added. The mixture was degassed as before. The reaction was carried out at 130° C. for 40 h. The block copolymer was obtained after dilution with chloroform (100 mL), precipitation from hexane, and drying. The $^1$H NMR results show a 4vp/pfotms ratio of 1/0.55. The DSC results indicate the block copolymer has two Tgs (49° C. and 140° C.).

A random copolymer of poly[p/m-[[(perfluorohexylethylene)thio]methyl]-styrene or poly[p/m-[[(perfluorohexylethylene)oxy]methyl]-styrene and 4-vinyl pyridine can be synthesized by mixing 1 equivalent of 4-vinylpyridine with 1 equivalent of para or p/m-[[(perfluorohexylethylene)thio]methyl]-styrene in THF at a suitable concentration e.g., 66% concentration, of the p/m-[[(perfluorohexylethylene)thio]methyl]-styrene. 3 mol % of azobisisobutyronitrile (AIBN) is then added and mixture is degassed for 20 minutes, afterwards reaction mixture is stirred at a suitable temperature, e.g., 60 degrees centigrade, for about 14 hours, after which reaction is cooled and precipitated in isopropanol. Solvent is then decanted and precipitate is re-dissolved in acetone. The product in acetone is re-precipitated in fresh isopropanol, filtered using a coarse fritted funnel, washed with isopropanol and dried in vacuum oven overnight.

The random copolymer can be synthesized using other free radical polymerization processes also, for example, all thermally and UV activated radical initiators used for organic reactions can be used for this purpose.

A random copolymer, e.g., poly(pfotms-ran-4vp), at a monomer ratio of 1:1 yields a copolymer soluble in acetone and is particularly suitable for membrane coating.

The use of (2,2,6,6-tetramethylpiperidin-1-yl)oxyl (TEMPO) for the block polymerization allows a slow growth rate of the polymer chain and a recombination of the shorter chains resulting in block copolymers with narrow molecular weight distributions of 1.2-1.5.

In an embodiment, the number average molecular weight of the random copolymer is about 5 KDa to about 100 KDa, particularly 10 KDa to about 60 KDa, and more particularly about 50 KDa. The number average molecular weight is determined by GPC.

The average molecular weight of the random copolymer is about 50 kDa, while the molecular weight of the block copolymer is dependent upon the duration of the polymerization reaction.

The block copolymer can be synthesized by any suitable process, including, e.g., atom transfer radical polymerization (ATRP), iodine transfer polymerization (ITP), anionic polymerization and other forms of nitroxide mediated radical polymerization (NMP).

The number average molecular weight of the block copolymer is about 10 KDa to about 400 KDa, particularly 50 KDa to about 200 KDa, and more particularly about 150 KDa. While the molecular weight of the block copolymer would depend upon the duration of polymerization, the average molecular weight for the block is around 400 KDa for an 86 hours run.

The present invention further provides a porous membrane comprising any of the copolymers described above, wherein the porous membrane is free standing or is disposed on a porous support, e.g., a porous polymeric support.

In an embodiment, the porous polymeric support is selected from PVC/PAN, polysulfone, polyethersulfone, HDPE, PET, PPS, PPSU (polyphenyl sulfone), PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

The porous membrane can be oleophobic, particularly an oleophobic membrane with a CWST of about 23 dynes/cm or less, e.g., 21 or 22 dynes/cm. The porous membrane can be, e.g., a functionally-as-made membrane, comprising the polymer for making the porous membrane and the copolymer; or it can be, e.g., a porous membrane coated with the copolymer.

CWST can be measured by a suitable method. In an embodiment, the method relies on a set of solutions of certain composition. Each solution has specific surface tension. The solutions surface tension ranges from 15 to 92 dyne/cm in small non-equivalent increments. To measure membrane surface tension, it is positioned on to top of white light table, one drop of a solution of certain surface tension is applied to the porous membrane surface and the time the drop takes to penetrate through the porous membrane and become bright white as an indication of light going through the porous membrane is recorded. Instant wetting is considered when the time the drop takes to penetrate the porous membrane is <10 seconds. If the time >10 seconds, the solution is considered to partially wet the porous membrane.

In accordance with an embodiment of the invention, the porous membrane is a porous membrane, e.g., a nanoporous membrane, for example, a porous membrane having pores of diameter between 1 nm and 100 nm, or a microporous membrane having pores of diameter between 1 μm and 10 μm.

The porous membrane may also be a functionalized membrane comprising one or more functional groups. The porous membrane can be, e.g., a charged membrane. Functionalization of the porous membrane can result in a CWST up to about 50 dynes/cm. Functional groups may include, e.g., a cation, an anion, a polar group, which can be introduced on the pyridyl ring after the formation of the copolymer by techniques known to those skilled in the art.

The present invention further provides a method of preparing a porous membrane comprising a copolymer as described above, the method comprising, in an embodiment:

(i) dissolving the copolymer in a solvent to obtain a solution comprising the copolymer;
(ii) casting the solution from (i) to obtain a coating;
(iii) evaporating the solvent from the coating; and optionally
(iv) washing the coating to obtain the porous membrane.

In another embodiment, the invention provides a method of preparing a porous membrane comprising a copolymer as described above, the method comprising:

(i) dissolving the copolymer and a second polymer in a solvent to obtain a solution comprising the copolymer and the second polymer;

(ii) mixing the solution from (i) with a pore-forming powder to obtain a mixture; (iii) casting the mixture from (ii) to obtain a coating;

(iv) evaporating the solvent from the coating;
(v) washing the coating to remove the pore-forming powder; and
(vi) drying the resulting membrane.

The porous membrane can be prepared, for example, by dissolving the copolymer, e.g., poly(pftoms-co-vp), and a second polymer, e.g., PVC-AN, in a suitable solvent or a mixture of solvents, e.g., THF and stirring at 600 rpm for 60 min, then adding dissolvable particles, such as $NaHCO_3$ particles, that achieve the desired pore size into solution and stirring at 1500 rpm for 120 min. This mixture is then cast onto a substrate such as PET on a glass plate. After slow evaporation of the solvent at room temperature, the porous membrane is soaked in a dilute HCl solution overnight to remove the dissolvable particles. The resulting membrane is dried at a suitable temperature, e.g., 40° C. to 100° C., in particular 80° C., depending on the boiling point of the solvent, in an oven for a suitable time to remove the solvent, for example, 60 min.

Suitable second polymers also include HDPE, PET, PPS, PPSU (polyphenyl sulfone), PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

Suitable dissolvable particles which can be used in the method above include potassium carbonate, zeolite, cellulose, soluble fibers, silica particles, and nanoparticles; example zinc oxide.

Figure 2:
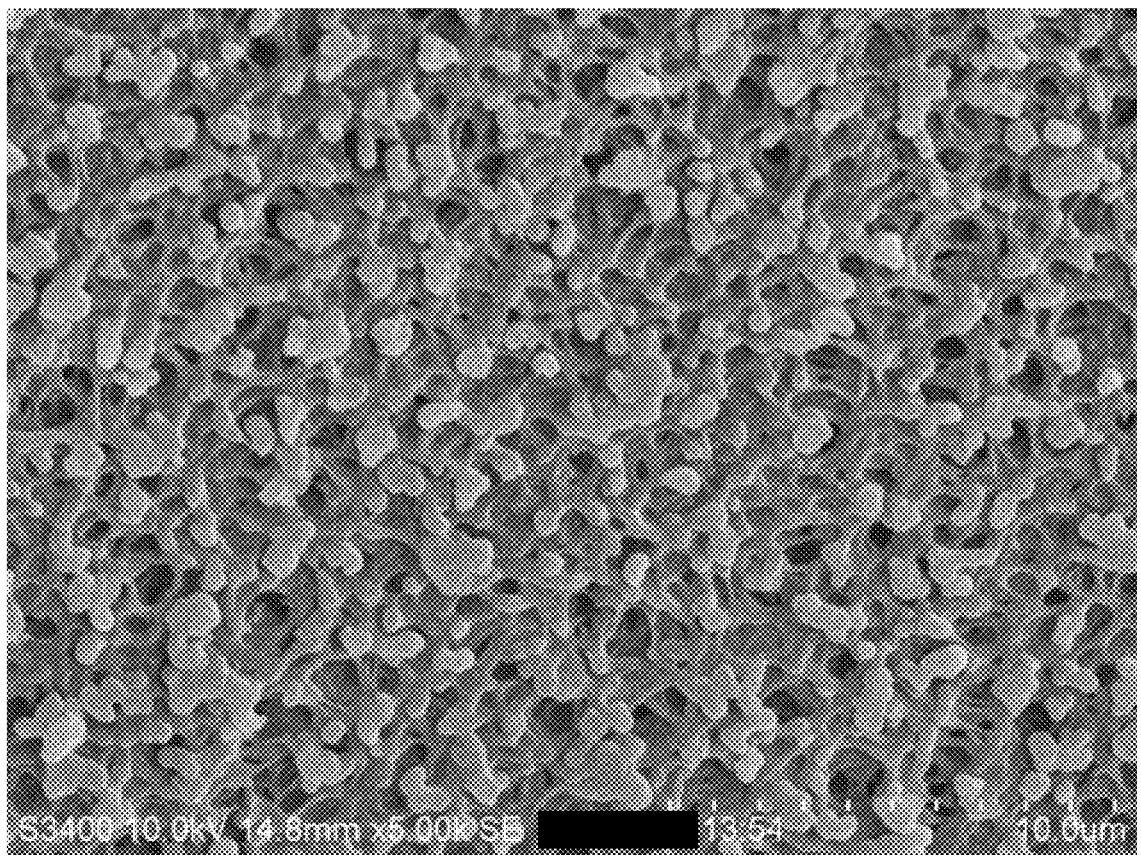
FIG. 2 depicts an SEM micrograph of the surface of a copolymer coated on a PTFE support in accordance with an embodiment of the invention.

The porous membrane can comprise the copolymer in one of many ways. For example, the porous membrane may include a coating comprising the copolymer. The porous membrane can be prepared by dissolving 2% copolymer in a suitable solvent, e.g., acetone, and a porous support, such as PTFE, is dipped in the polymer solution for 2 seconds. The coated support is dried in an oven at 80° C. for 20 minutes, and the product is soaked in IPA for 2 hours, dried in an oven for 30 minutes at 80° C. to obtain the porous membrane. SEM micrographs of the surface of a PTFE support and a porous membrane coated on support depicted in FIG. 1-2, respectively.

The fluorinated chain must be present in at least 35% by volume of the polymer in order to impart oleophobicity to the porous membrane. Additionally, the volume ratio of the perfluoro-styrene block in the random copolymer must not be greater than 50% for the polymer to be soluble in non-fluorinated solvents.

Advantageously, the copolymer can impart oleophobic properties to a material, such as, e.g., a porous membrane, providing a surface tension of 23 dynes or less on the material without the need for post-treatment. A porous membrane, including the copolymer, is stable in acids, bases, organic solvents, oxidizers, and stable at high temperatures and against gamma irradiation. High water breakthrough pressures and air flow rates can be achieved in the porous membrane, and it can be easily functionalized, such as, e.g., with cationic and anionic groups.

The porous membrane can also be used to remove trace metals such as Li, Na, K (and other Group 1 metals); Mg, Ca (and other Group 2 metals); Al (and other Group 3 metals), Pb (and other Group 4 metals), Sb, Bi (and other Group 5 metals), and Cd, Cr, Mo, Pd, Ag, W, V, Mn, Fe, Ni, Cu, Zn (and other Transition metals) from water and organic fluids in many applications, such as, e.g., those in the microelectronics industry, for example, down to a level of 0.005 ppb or to the detection limit of the instrument.

The present invention includes the following embodiments, but not limited to:
1) A random copolymer comprising Segment A and Segment A, wherein Segment A is poly[p/m-[[(perfluorohexylethylene)thio]methyl]-styrene or poly[p/m-[[(perfluorohexylethylene)oxy]methyl]-styrene; and Segment B is 4-vinylpyridine;
2) A block copolymer comprising Segment A and Segment B, wherein Segment A is poly[p/m-[[(perfluorohexylethylene)thio]methyl]-styrene or poly[p/m-[[(perfluorohexylethylene)oxy]methyl]-styrene; and Segment B is 4-vinylpyridine;
3) A porous membrane comprising a hydrophilic, hydrophobic or charged membrane and a coating comprising a random copolymer comprising Segment A and Segment B, wherein Segment A is poly[p/m-[[(perfluorohexylethylene)thio]methyl]-styrene or poly[p/m-[[(perfluorohexylethylene)oxy]methyl]-styrene; and Segment B is 4-vinylpyridine; wherein, when coated with the copolymer, the porous membrane is an oleophobic membrane with surface tension of 23 dynes/cm or less;
4) A porous PTFE membrane comprising a coating comprising a block copolymer, the block copolymer comprising Segment A and Segment B, wherein Segment A is poly[p/m-[[(perfluorohexylethylene)thio]methyl]-styrene or poly[p/m-[[(perfluorohexylethylene)oxy]methyl]-styrene and Segment B is 4-vinylpyridine; wherein, when coated, the PTFE membrane has a surface tension of 23 dynes/cm or less in hydrocarbons and is hydrophilic in hydrogen bonding solvents with surface tension of about 58 dynes/cm or less;
5) A self-assembled membrane comprising a block copolymer, the block copolymer comprising Segment A and Segment B; wherein Segment A is poly[p/m-[[(perfluorohexylethylene)thio]methyl]-styrene or poly[p/m-[[(perfluorohexylethylene)oxy]methyl]-styrene and Segment B is 4-vinylpyridine.

In accordance with embodiments of the invention, the porous membrane can have a variety of configurations, including planar, flat sheet, pleated, tubular, spiral, and hollow fiber. In one embodiment, the porous membrane is a hollow-fiber membrane.

Porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The porous membrane, according to embodiments of the invention, can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, the porous membranes according to embodiments of the invention can be used to filter air and/or gas and/or can be used for venting applications (e.g., allowing air and/or gas, but not liquid, to pass therethrough). Porous membranes according to embodiments of the inventions can be used in a variety of devices, including surgical devices and products, such as, for example, ophthalmic surgical products.

The present invention further provides a method of filtering a fluid, the method comprising passing the fluid through any of the porous membranes described above. For example, trace metal impurities continue to pose a problem in the manufacture of next generation semiconductor and microelectronics materials. One embodiment of the invention comprises a method of removing metals from a fluid, particularly a microelectronics fluid, by passing the metal-containing fluid through a porous membrane including the copolymer and removing the metals from the fluid. In one embodiment, the inventive method includes passing the metal-containing fluid through a functionalized porous membrane including the copolymer and a functional group and removing the metals from the fluid. The functionalized membrane can remove about 99% of most trace metals from the fluid.

The following examples further illustrate the invention but, of course, should not be construed as in any way limiting its scope.

Example 1

This example illustrates the preparation of a block copolymer of perfluorohexyl ethyl thiol and vinylpyridine, or poly(pfotms-block-4vp), in accordance with an embodiment of the invention.

4-vinylpyridene (4VP) and perfluorohexyl ethyl thiomethyl styrene (pfotms) was added after 40 hours. A solution of 4VP (2.63 g, 25 mmol in 2.4 mL chlorobenzene), recrystallized benzyl peroxide (0.061 g, 0.25 mmol) and TEMPO (0.05 g, 0.32 mmol) was charged into a round-bottomed flask. After being degassed in an ice water bath for 20 min, the reaction mixture was heated at 95° C. for 3 h to decompose BPO completely, and at 125° C. for 40 h to allow the polymerization to proceed. The reaction mixture was then cooled to room temperature, and pfotms (6.2 g, 12.5 mmol in 1.6 mL chlorobenzene) was added. The mixture was degassed as before. The reaction was carried out at 130° C. for 40 h. The block copolymer was obtained after dilution with chloroform (100 mL), precipitation from hexane, and drying. NMR results show 4vp/pfotms ratio of 1/0.55. DSC results indicate the block copolymer has two Tgs (49° C. and 140° C.).

Example 2

This example illustrates the preparation of a random copolymer of perfluorohexyl ethyl thiol and vinylpyridine, or poly(pfotms-ran-4vp), in accordance with an embodiment of the invention.

Perfluorohexyl ethyl thiol methylstyrene (10 mmol) was dissolved in a 250 mL round-bottomed flask containing ethanol (10 mL) at 60° C., and 4-vinylpyridine (10 mmol) was added. The reaction mixture was purged with nitrogen for 20 minutes and AIBN (360 mg, 0.989 mmol, 10 mol %) was then added, and the purging was continued for additional 5 minutes. Afterwards, the reaction mixture was stirred at 60° C. for 16 hours. The product obtained was allowed to cool to room temperature, and rinsed with water and acetone sequentially, and dried in vacuum oven with $P_2O_5$ overnight.

A random copolymer of perfluorooctyl ethyl thiol and vinylpyridine, or poly(pfdtms-ran-4vp), was synthesized using the same procedure.

Example 3

A porous membrane was prepared by mixing poly(pftoms-co-vp) and PVC-AN in THF and stirring at 600 rpm for 60 min, adding $NaHCO_3$ particles, and stirring at 1500 rpm for 120 min. This mixture was cast onto a PET substrate on a glass plate. After slow evaporation of THF at room temperature, the resulting cast was soaked in a dilute HCl solution overnight to remove the sodium bicarbonate particles. The resulting membrane was dried at 80° C. in an oven for 60 min.

Example 4

This example illustrates some of the properties of the random copolymers and of the porous membranes. Table 1 sets forth the glass transition temperatures of the copolymers and homopolymers.

TABLE 1

Polymer Characterization and Comparison

| Polymer | Tg1, ° C. | Tg2, ° C. |
|---|---|---|
| poly(pfotms) | 49 | — |
| poly(pfotms-b-4vp) | 49 | 140 |
| poly(4vp) | — | 140 |
| poly(pfotms-ran-4vp) | 98 | |

Table 2 illustrates the surface tension measurements of the coated membranes, and airflow/water breakthrough characterization.

TABLE 2

| Concentration | CWST | WBT | AF |
|---|---|---|---|
| p(pfotms-b-Nvp) in Novec 71 IPA | 20.14 | >50 | 3.75 |
| 2% p(4vp-pfotms) in MeOH | 20.14/58 | >50 | NA |
| 2% p(pfdtms-ran-4vp)_4 in MeOH | 35 | >50 | NA |
| 2% p(pfdtms-ran-4vp)_4 in MeOH | 20.14 | >50 | NA |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A porous membrane comprising a copolymer disposed on a porous polymeric support, wherein the porous polymeric support is selected from PVC/PAN, polysulfone, polyethersulfone, PET, PPS, PPSU (polyphenyl sulfone), PTFE, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane, wherein the copolymer is a copolymer of monomeric units I and II, wherein monomeric unit I is of the formula

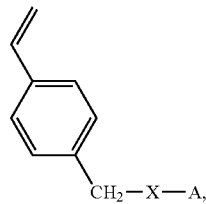

wherein A is Rf—(CH$_2$)n, Rf is a perfluoro alkyl group of the formula CF$_3$—(CF$_2$)$_x$—, wherein x is 3-12, n is 1-6, and X is S, and monomeric unit II is vinylpyridine;

wherein the porous membrane has a critical wetting surface tension (CWST) of 23 dynes/cm or less.

2. The porous membrane of claim 1, wherein the porous polymeric support is selected from PVC/PAN, polysulfone, polyethersulfone, PET, PPS, PPSU (polyphenyl sulfone), PVDF, PVF (polyvinyl fluoride), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

3. A method of preparing a porous membrane according to claim 1, the method comprising:
(i) dissolving the copolymer in a solvent to obtain a solution comprising the copolymer;
(ii) casting the solution from (i) to obtain a coating;
(iii) evaporating the solvent from the coating; and optionally
(iv) washing the coating to obtain the porous membrane.

4. A method of filtering a fluid, the method comprising passing the fluid through the porous membrane of claim 1.

5. The porous membrane of claim 1, wherein n=2.

6. The porous membrane of claim 1, wherein x=4-8.

7. The porous membrane of claim 1, wherein the vinylpyridine is 4-vinyl pyridine.

8. The porous membrane of claim 1, wherein the copolymer is a block copolymer.

9. The porous membrane of claim 1, wherein the copolymer is a random copolymer.

10. The porous membrane of claim 5, wherein the porous polymeric support is selected from PVC/PAN, polysulfone, polyethersulfone, PPS, PPSU (polyphenyl sulfone), PVF (polyvinyl fluoride), FEP (fluorinated ethylene-propylene), PFPE (perfluoropolyether), PFSA (perfluorosulfonic acid), and perfluoropolyoxetane.

11. The porous membrane of claim 6, wherein the porous polymeric support is selected from PVC/PAN, polysulfone, polyethersulfone, PPS, PPSU (polyphenyl sulfone), PVF (polyvinyl fluoride), FEP (fluorinated ethylene-propylene), PFPE (perfluoropolyether), PFSA (perfluorosulfonic acid), and perfluoropolyoxetane.

12. The porous membrane of claim 7, wherein the porous polymeric support is selected from PVC/PAN, polysulfone, polyethersulfone, PPS, PPSU (polyphenyl sulfone), PVF (polyvinyl fluoride), FEP (fluorinated ethylene-propylene), PFPE (perfluoropolyether), PFSA (perfluorosulfonic acid), and perfluoropolyoxetane.

13. The porous membrane of claim 8, wherein the porous polymeric support is selected from PVC/PAN, polysulfone, polyethersulfone, PPS, PPSU (polyphenyl sulfone), PVF (polyvinyl fluoride), FEP (fluorinated ethylene-propylene), PFPE (perfluoropolyether), PFSA (perfluorosulfonic acid), and perfluoropolyoxetane.

14. The porous membrane of claim 9, wherein the porous polymeric support is selected from PVC/PAN, polysulfone, polyethersulfone, PPS, PPSU (polyphenyl sulfone), PVF (polyvinyl fluoride), FEP (fluorinated ethylene-propylene), PFPE (perfluoropolyether), PFSA (perfluorosulfonic acid), and perfluoropolyoxetane.

* * * * *